United States Patent [19]

Wegmann

[11] 4,114,560
[45] Sep. 19, 1978

[54] FLOW SENSOR

[75] Inventor: Jerome B. Wegmann, St. Louis, Mo.

[73] Assignee: McNeil Corporation, Akron, Ohio

[21] Appl. No.: 797,932

[22] Filed: May 18, 1977

[51] Int. Cl.² .................... F16N 29/00; G01F 15/06
[52] U.S. Cl. ................................. 116/117 R; 184/1 C
[58] Field of Search .................. 116/114 PV, 117 R; 184/1 C, 6.4; 137/514, 514.3, 514.5

[56] References Cited

U.S. PATENT DOCUMENTS

| | | | |
|---|---|---|---|
| 2,105,493 | 1/1938 | Gartin | 184/1 C |
| 2,593,522 | 4/1952 | Barnes | 137/514.5 X |
| 2,615,419 | 10/1952 | Topping | 116/70 |
| 3,074,428 | 1/1963 | Mancewicz | 137/514 |
| 3,093,109 | 6/1963 | Pedersen | 116/117 R |
| 3,322,234 | 5/1967 | Mueller et al. | 184/6.4 |
| 3,500,958 | 3/1970 | Callahan et al. | 184/6.4 |
| 3,526,297 | 9/1970 | Rotter et al. | 184/1 C |

*Primary Examiner*—Daniel M. Yasich
*Attorney, Agent, or Firm*—Koenig, Senniger, Powers and Leavitt

[57] ABSTRACT

A flow sensor for sensing failure of flow of lubricant through a lubricant line, in which a piston is held away from a no-flow position against a spring by pressure of lubricant flowing in the line, the piston being moved by the spring to the no-flow position upon failure of flow thereby to signal the failure, and in which an adjustable bleed is provided to retard the movement of the piston to the no-flow position for signalling only upon a relatively prolonged failure of flow and not upon a relatively short cessation of flow.

10 Claims, 18 Drawing Figures

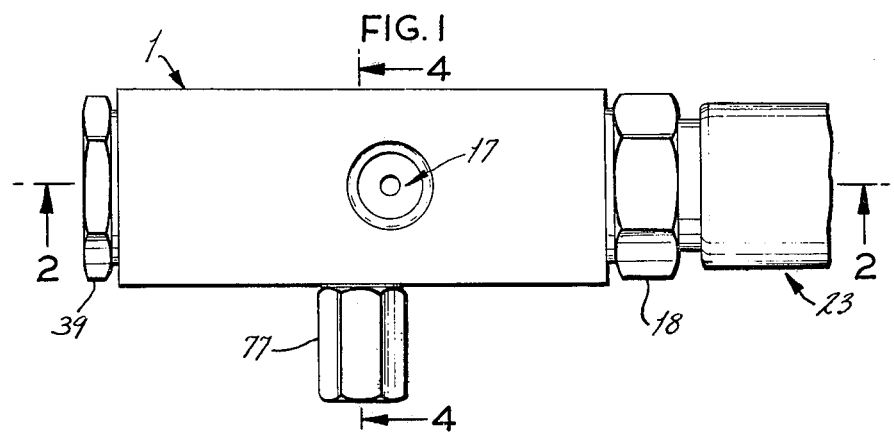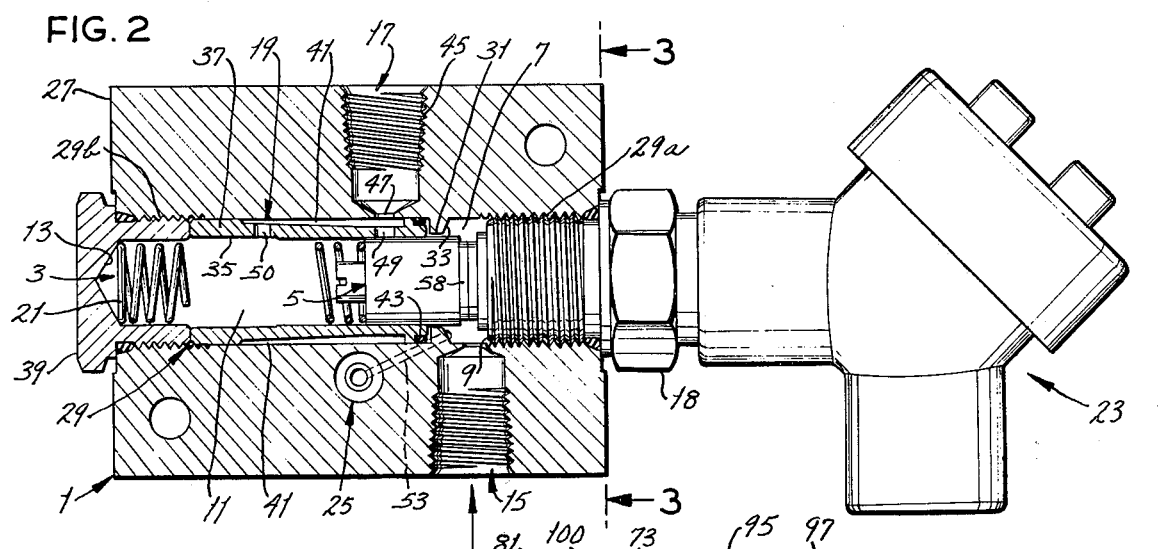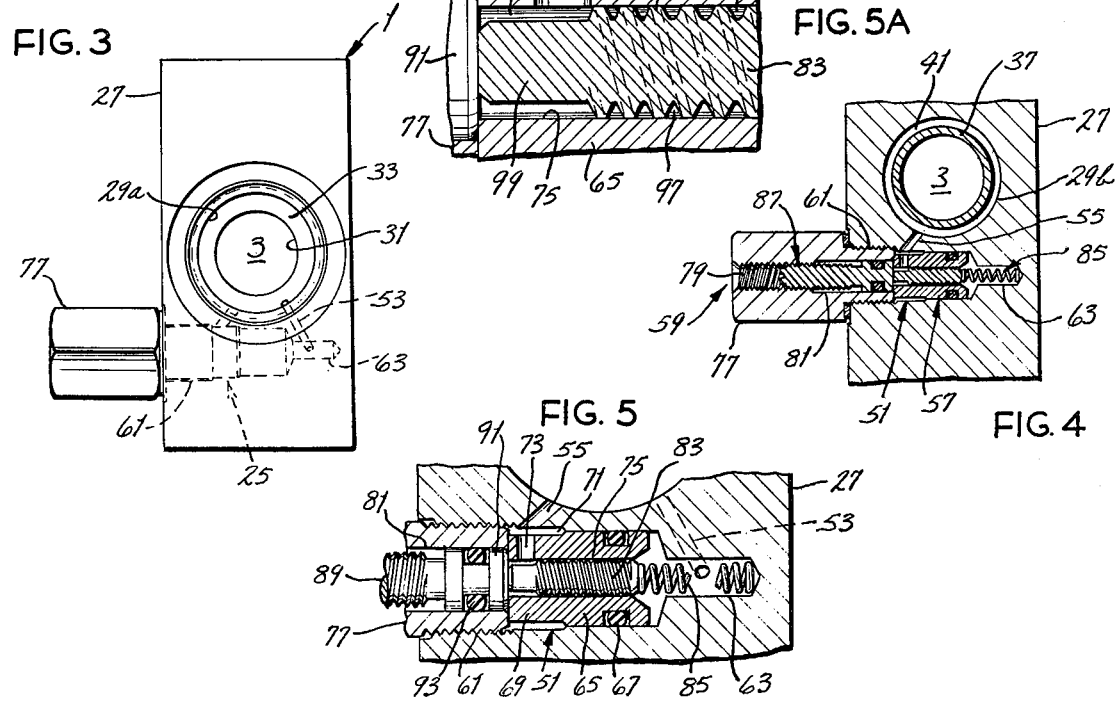

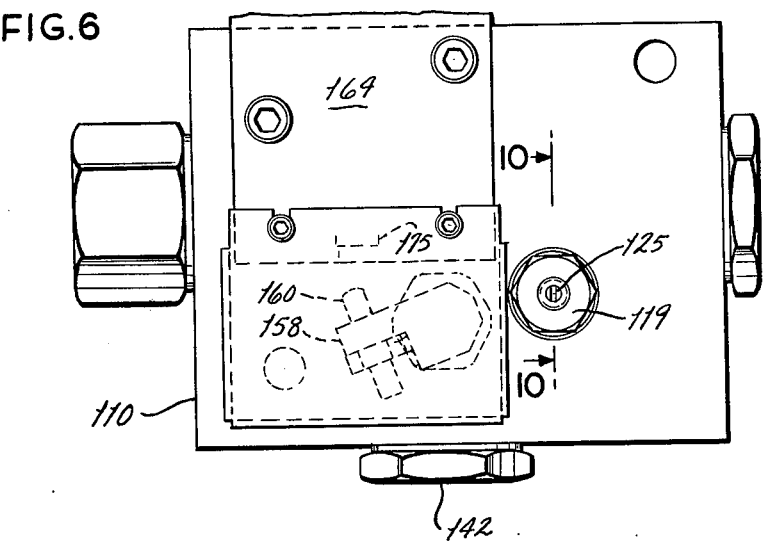
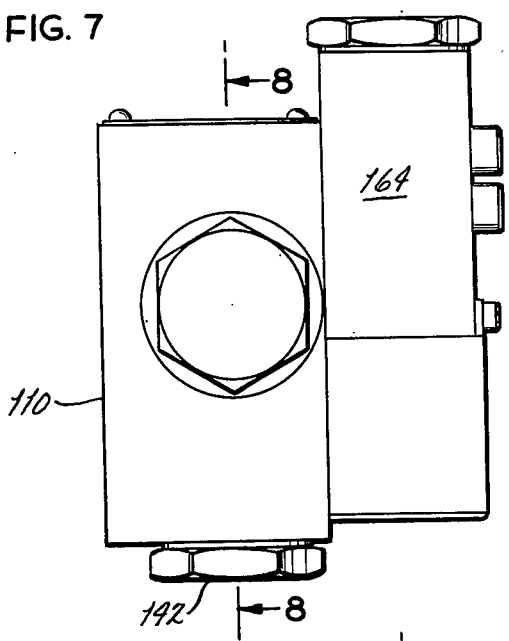
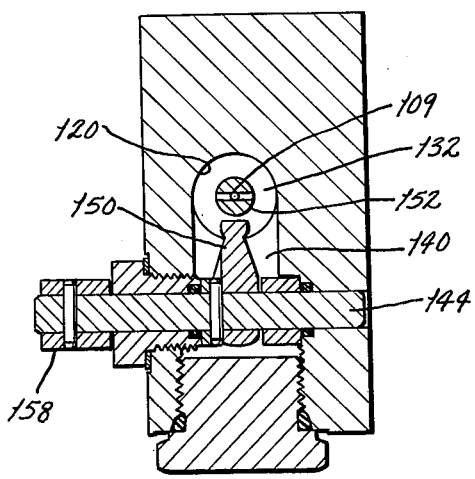
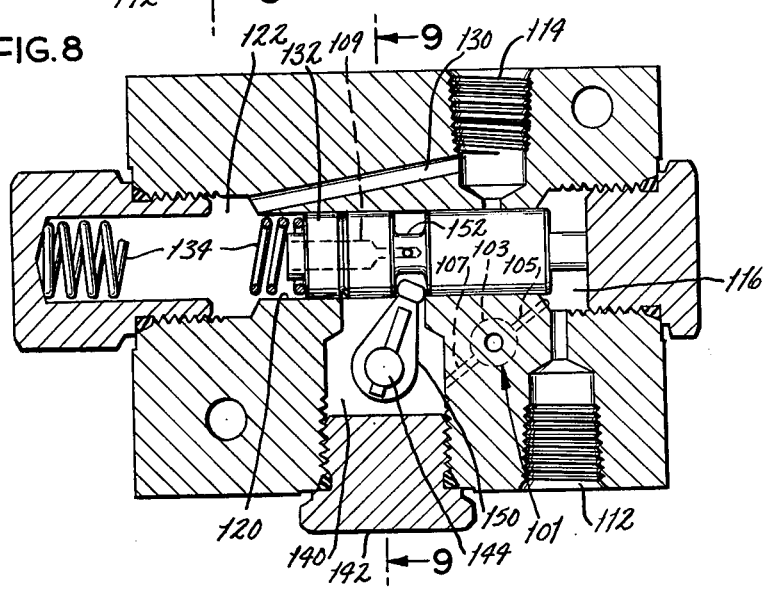
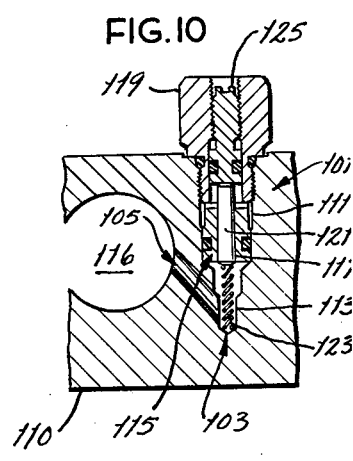

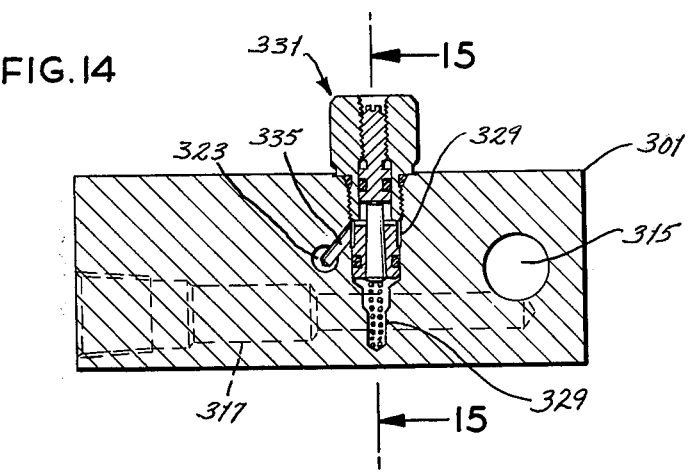
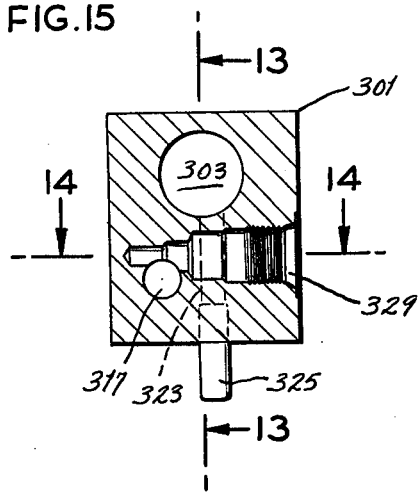
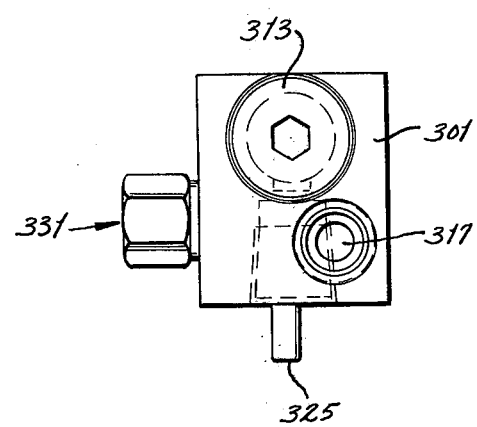
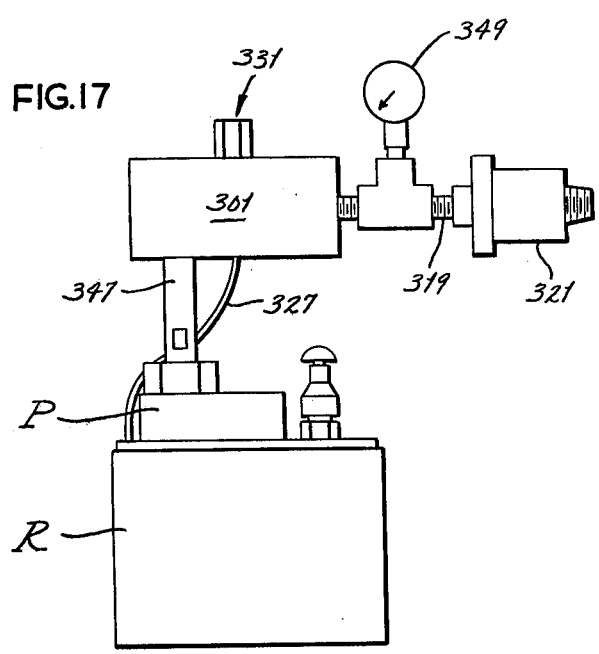

FLOW SENSOR

BACKGROUND OF THE INVENTION

This invention relates to flow sensors and more particularly to such devices for sensing failure of flow of lubricant in a lubricating system.

The invention is in the same field as and in certain respects involves an improvement upon the lubricant flow sensing valves shown in U.S. Pat. No. 3,500,958 issued Mar. 17, 1970, now owned by the assignee of this application. Each of the valves shown in this patent includes a piston constituting a valve member spring-biased toward a no-flow position in which it blocks a lateral outlet, and movable against the bias by pressure of fluid from the inlet of the valve to a flow-through position unblocking the outlet, the arrangement being such that on failure of flow the piston is spring-biased to its no-flow position and actuates means for signalling the no-flow condition. The space in the valve in back of the piston is in communication with the outlet. To retard the movement of the piston to its no-flow position, according to said patent (and as has been done in actual practice) the piston is dimensioned to have a close but nonsealing fit, referred to in said patent as a "dashpot" fit, for the purpose of signalling failure of flow only upon a relatively prolonged failure (e.g., approximately one minute) and not upon a relatively short cessation of flow. In this regard, these flow sensing valves are widely used in a lubricating system wherein lubricant is pumped from a supply by a plunger pump which is a single-acting pump operable to deliver a predetermined volume of lubricant on a pressure stroke of its plunger and to re-charge with lubricant without delivery of lubricant on a return or priming stroke of the plunger. Movement of the piston to its no-flow position (with the resultant no-flow signal) must be retarded to the extent that a no-flow signal is not given during a return stroke of the plunger in the normal course of operation of the pump, a no-flow signal being given only if flow ceases for an interval longer than the return stroke interval (and then not being too long delayed.

In actual practice, valves with the piston having the "dashpot" fit of U.S. Pat. No. 3,500,958 have presented problems in certain instances, in particular where the valves may be used under relatively high or relatively low temperature conditions. Thus, under high temperature conditions with attendant decrease in lubricant viscosity, the sensor may signal flow failure too soon, and under low temperature conditions with attendant increase in lubricant viscosity, it may signal flow failure too late. The clearance between the piston and the wall of its bore, the lubricant viscosity and the spring force on the piston are the principal factors which determine the length of time it takes the piston to move to its no-flow position. It is difficult, in manufacturing the valves, to hold close tolerance on the clearance, and since the flow through the clearance is proportional to the third power of the clearance, variations in clearance radically affect the flow and hence the time delay. Also, while the spring force is a linear variable, the viscosity of the lubricant is nonlinearly variable in accordance with its temperature. Thus, as to the prior valves shown in U.S. Pat. No. 3,500,958, it is possible to obtain consistency of the time-delay interval only over a relatively narrow range.

SUMMARY OF THE INVENTION

Among the several objects of the invention may be noted the provision of an improved flow sensor of the type shown in U.S. Pat. No. 3,500,958 with improved consistency of the time-delay interval for signalling flow failure over a wide range of temperatures; the provision of such a sensor which, while having such consistency of operation, does not require maintaining such close tolerance in the manufacture of parts; and the provision of such a sensor which may be used to sense flow failure of a wider range of lubricants.

In general, a flow sensor of this invention comprises a body having a cylinder therein closed at its ends and a piston slidable axially in the cylinder dividing the cylinder into a first chamber between the piston and a first end of the cylinder and a second chamber between the piston and the second end of the cylinder. The body has an inlet for delivery of fluid under pressure to the first chamber, and an outlet located between the inlet and the second end of the cylinder interconnected with the second chamber. The piston is movable away from a no-flow position adjacent the first end of the cylinder, wherein its blocks the outlet from the inlet to a flow-through position wherein it unblocks the outlet from the inlet for flow of the fluid from the inlet to and out through the outlet. Spring means is provided biasing the piston to its no-flow position, the piston being movable against the bias by the pressure of fluid in the first chamber to its flow-through position, and means is provided for signalling when the piston is in its no-flow position. An adustable bleed is provided in the body for passage of fluid from the first chamber to the second chamber at a controlled rate when flow ceases and the spring means moves the piston to its no-flow position to retard the movement of the piston.

Other objects and features will be in part apparent and in part pointed out hereinafter.

BRIEF DESCRIPTION OF THE DRAWINGS

FIG. 1 is a plan of a flow sensor of this invention having an electrical no-flow signalling means;

FIG. 2 is a longitudinal section on line 2—2 of FIG. 1;

FIG. 3 is an end view on line 3—3 of FIG. 2 rotated 90° with parts removed;

FIG. 4 is a section on line 4—4 of FIG. 1, with parts removed;

FIG. 5 is an enlarged fragment of FIG. 4;

FIG. 5A is an enlarged fragment of FIG. 5;

FIG. 6 is a side elevation of an alternative embodiment of the invention;

FIG. 7 is a left end elevation of FIG. 6;

FIG. 8 is a longitudinal section on line 8—8 of FIG. 7;

FIG. 9 is a transverse section on line 9—9 of FIG. 8;

FIG. 10 is a transverse section on line 10—10 of FIG. 6, broken away at the left, and turned 90°;

FIG. 14 is a horizontal longitudinal section of the fourth embodiment taken on line 14—14 of FIG. 15;

FIG. 15 is a vertical transverse section taken on line 15—15 of FIG. 14;

FIG. 16 is an end view of the fourth embodiment, as viewed from the left of FIG. 14; and FIG. 17 is a view showing the fourth embodiment installed in a system for sensing failure of delivery of a pump.

Corresponding reference characters indicate corresponding parts throughout the several views of the drawings.

DESCRIPTION OF THE PREFERRED EMBODIMENTS

Figure 11:
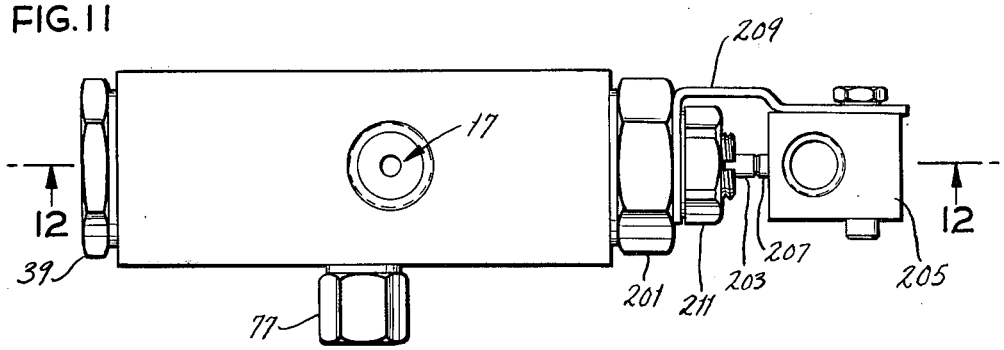
FIG. 11 is a plan of a third embodiment.

Referring first to FIGS. 1-4, a flow sensor of this invention is shown to comprise a valve body generally designated 1 having a cylinder 3 therein closed at its ends and a valve member constituted by a piston 5 slidable axially in a cylinder dividing the cylinder into a first chamber 7 between the piston and a first end 9 of the cylinder and a second chamber 11 between the piston and the second end 13 of the cylinder. The body 1 has an inlet 15 for delivery of fluid (e.g., lubricant) under pressure to the first chamber 7, a lateral outlet indicated generally at 17 located between the inlet and the second end 13 of the cylinder, and a passage indicated generally at 19 providing intercommunication between the outlet 17 and the second chamber 11. The piston 5 is movable toward the left as shown in FIG. 2 away from the no-flow postion adjacent the first end 9 of the cylinder in which it is illustrated in FIG. 2, and wherein it blocks the outlet 17 while leaving the inlet 15 open, to a flow-through position wherein it unblocks the outlet for flow of lubricant from the inlet through the cylinder 3 and thence out through the outlet. Spring means constituted by a coil compression spring 21 in the second chamber 11 reacting from the second end 13 of the cylinder against the left end of the piston biases the piston toward the right to its no-flow position of FIG. 1. The piston is movable toward the left against the spring bias by the pressure of lubricant in the first chamber 7 to its stated flow-through position, spring 21 being such as to permit this range of movement of the piston. Means indicated generally at 23 is provided for signalling when the piston is in its no-flow position. This may include a plug 18 corresponding to the plug 18 shown in said U.S. pat. No. 3,500,958, an electrical contact member 58 corresponding to the member 58 shown in said patent, and a signal circuit (not shown) corresponding to 52 shown in said patent. In accordance with this invention, an adjustable bleed passage means generally designated 25 is provided in the body 1 interconnecting the first and second chambers 7 and 11 for passage of lubricant from the first chamber 7 to the second chamber 11 when flow of lubricant ceases and spring 21 moves the piston 5 to its FIG. 1 no-flow position to retard the movement of the piston and thereby provide a time delay between cessation of flow and signalling the cessation.

More particularly, the valve body 1 comprises a metal block 27 of rectangular cross section having an opening 29 extending from one end thereof through to the other, and comprising a first bore 29a drilled in from the right and a second bore 29b coaxial with bore 29a drilled in from the left, with an annular flange 31 between the inner ends of these sections. This flange has an annular frustoconical face 33 facing toward the outer end of the section 29a and inclined in the direction away from the outer end of section 29a. Cylinder 3 includes the bore 35 of a tubular bushing 37 inserted in the bore 29b from the outer end thereof and retained in bore 29b by a plug 39 threaded in the outer end of bore 29b, this plug constituting the closure for the second end 13 (the left end) of cylinder 3. The bushing has a relatively wide annular peripheral groove providing an annular space 41 between the bushing and the portion of the body 27 surrounding the bushing. An O-ring 43 accommodated in a groove at the inner end of the bushing provides a seal between the bushing and the inner end of the bore 29b.

The inlet 15 extends through the body 27 from one side thereof to the bore 29a, leading into this bore adjacent the flange 31. The outlet 17 includes an outer opening 45 extending through the body 27 from the opposite side of the body to the bore 29b with its inner end 47 in communication with the annular space 41, and an inner opening or port 49 in the bushing 37 shown as aligned with the inner end 47 of the outer opening 45. This port 49 is adapted to be blocked by the piston 5 as the latter moves to its no-flow position of FIG. 2 and occupies said no-flow position, the position generally having a sliding sealing fit in the bore 35 of the bushing 37, and is unblocked for flow of lubricant from the inlet 15 via the stated first chamber 7, bore 35, port 49 to the space 41, and thence out through the outlet 17. The space 41 and chamber 11 are in communication via a port 50 in bushing 37. The ports 49 and 50 are spaced apart a distance greater than the length of the piston 5 so that when the piston moves from its FIG. 2 no-flow position wherein it blocks port 49 to its flowthrough position unblocking port 49, port 50 remains open for communication between chambers 7 and 11.

The adjustable bleed 25 comprises a recess 51 extending into the body or block 27 from the exterior of the body (from the left side of the body as viewed in FIG. 4), a first passage 53 for flow of lubricant from the stated first chamber 7 to this recess as the piston 5 moves to its no-flow position (toward the right as viewed in FIG. 2) and a second passage 55 for flow of lubricant from the recess to the stated second chamber 11, with means indicated generally at 57 in the recess providing an adjustable restriction to the flow of lubricant through the recess from the first passage 53 to the second passage 55, and means 59 accessible from the exterior of the body or block 27 for adjusting the restriction.

The recess 51 has a counterbore 61 toward its outer end and a reduced-diameter inner end extension 63, the passage 53 leading into this extension 63. The means 57 providing the adjustable restriction comprises a tubular bushing 65 fitted in the recess 51 with an O-ring 67 providing a seal between the bushing and the block 27 within the recess. The bushing has a reduced-diameter outer end section 69 within the counterbore providing an annular space 71 around section 69 within the counterbore, and a port 73 providing for communication from the bore 75 in the bushing to this annular space 71 and thence to passage 55, which leads from the annular space 71 to chamber 11. The bushing 65 is held in the recess 51 by a tubular retainer 77 threaded in the counterbore 61 of the recess, this retainer having a bore 79 with a counterbore 81 toward its inner end. At 83 is indicated a screw-threaded plug having a sliding sealing fit in the bore 75 in the bushing 65. This plug is biased by a spring 85 to slide in the direction toward the outer end of the bore 75 against a stop 87 adjustable in the tubular retainer 77. The stop comprises a stem 89 adjustably threaded in the bore 79 of the retainer 77, the stem having a head 91 at its inner end slidable in the counterbore 81 in the retainer engageable by the outer end of the plug. An O-ring 93 provides a seal between the head and the retainer in the counterbore 81.

The thread on the plug 83, which is indicated at 95 in FIG. 5A, provides a capillary passage 97 for restricted flow of lubricant from passage 53 through the inner end portion of the recess 51 to the port 73, and thence to the annular space 71 and the passage 55 for flow to the chamber 11. The thread 95 terminates short of the outer end of the plug, the latter having a reduced-diameter outer end section 99 so that there is an annular space 100 around the outer end of the plug within the bore 75 in the bushing 65. The plug 83 is adjustable axially in the bore 75 by threading the stop 87 in or out (the plug being held against the head 91 by the spring 85) to vary the effective length of the capillary passage 97 provided by the thread 95 on the plug within the bore 75 thereby to vary the restriction to the flow of lubricant from passage 53 to passage 55.

In the operation of the sensor, as long as lubricant under pressure is delivered via the inlet 15 to the chamber 7, the piston 5 is held back against the bias of spring 21 in its flow-through position wherein it unblocks the port 49 for flow of lubricant from the inlet through the cylinder 3 and thence out through port 49 and the outlet 45. With the piston 5 in the stated flow-through position, the contract member 58 is backed off from the plug 18 so that the signal circuit (such as indicated at 52 in U.S. Pat. No. 3,500,958) is open. Chambers 7 and 11 are in commun via ports 49 and 50 and the annular space 41, and pressure is thereby transmitted from chamber 7 to chamber 11 with a pressure drop due to the pressure drop between the inlet and the outlet, the higher pressure on the chamber 7 side of the piston thereby holding the piston in its flow-through position balanced against the lower pressure in chamber 11 plus the force of spring 21.

On a failure of flow, spring 21 moves piston 5 toward its no-flow position of FIG. 2, as enabled by displacement of lubricant from chamber 7 to chamber 11 via passage 53, capillary passage 97 and passage 55. The flow of lubricant from chamber 7 to chamber 11 is retarded by the capillary passage, and thus the movement of the piston toward its no-flow position is at a controlled and relatively slow rate, so that the piston reaches its no-flow position and contact member 58 contacts plug 18 to close the aforesaid signal circuit and signal failure of flow only upon a relatively prolonged failure of flow and not upon a momentary or relativey short failure.

It has been ascertained that the construction with the bleed from chamber 7 to chamber 11 via the passage 53, capillary passage 97 and passage 55 operates with much better consistency of the time-delay interval between flow failure and signalling of the failure over a relatively wide range of temperatures, while enabling manufacture of the capillary plug 83 with a substantially wider tolerance between the capillary plug 83 and the bore 75 in bushing 65 than the tolerance found necessary between the piston 32 and the bore or cylinder 20 of the prior sensor shown in U.S. Pat. No. 3,500,958. Thus, it has been found necessary to manufacture the prior sensor with a clearance of from 0.0007 inch to 0.0009 inch (i.e., a limited tolerance of 0.0002 inch) for reasonably satisfactory operation in different climates, and even then there may be difficulties under extreme climatic conditions. In contrast, the present sensor may be manufactured with a clearance of 0.0002 inch to 0.0009 inch (i.e., a much wider tolerance of 0.0007 inch) with reasonably satisfactory operation in different climates. Additionally, the capillary plug 83 of the present sensor is readily adjustable from the exterior of the valve body 1 for adjusting the effective length of the capillary passage 97 within the bore 75 of the bushing 65 and thereby adjusting the effective restriction to flow of lubricant from chamber 7 to chamber 11, whereby the sensor may be used to sense flow failure of a wider range of lubricants than the prior sensors, wherein the restriction is not adjustable. As above noted, the plug 83 is adjustable by threading the stop 87 in or out to vary the effective length of the capillary passage 97.

FIGS. 6–10 show an alternative embodiment of the invention, representing an improvement on the sensor shown in FIGS. 2–4 of U.S. Pat. No. 3,500,958 wherein the piston actuates a pneumatic valve for signalling failure of flow (as distinguished from closing an electrical circuit to signal failure of flow). As to this alternative embodiment, the construction is generaly the same as that shown in FIG. 2 of U.S. Pat. No. 3,500,958 and the same reference characters are used in FIGS. 6–10 as in FIG. 2 of said patent to designate similar points. Instead of transmitting lubricant from chamber 116 to chamber 122 via a clearance fit of piston 132 in its bore 120 as in the U.S. Pat. No. 3,500,958 sensor, the present sensor has an adjustable bleed passage means generally designated 101 for passage of lubricant from chamber 116 to chamber 122 when flow of lubricant ceases and spring 134 moves the piston 132 to its FIG. 8 no-flow position to retard the movement of the piston and thereby provide a time delay between cessation of flow and signalling the cessation.

As shown in FIG. 10, the adjustable bleed 101 comprises a recess 103 extending into the valve body or block 110 from the exterior of the body, a first passage 105 for flow of lubricant from chamber 116 to this recess, a second passage 107 for flow of lubricant from the recess to the opening or cavity 140 for the shaft 144 and operating arm 150 for the shaft, and a passage 109 through the piston 132 for flow of lubricant from the opening or cavity 140 to chamber 122. The recess 103 has an outer cylindrical portion 111 and an inner portion 113 of reduced diameter. A bushing 115 having a tapered bore 117 is fitted and sealed in portion 111 of the recess. The bushing is held in the recess 103 by a tubular retainer 119 threaded in the outer end of the recess. A tapered pin 121 is biased in outward direction in the tapered bore 117 of the bushing by a spring 123 reacting from the inner end of the recess against the inner end of the pin, which is its larger end. The pin 121 is adapted to be moved endwise in the tapered bore 117 (in downward direction as viewed in FIG. 10) against the bias of spring 113 to open up a restricted passage for flow of lubricant between the internal surface of the bushing in the bore 111 and the pin for restricted flow of lubricant, with this passage being adjustable via endwise adjustment of the pin by an adjusting screw member 125 threaded in the plug. Passage 105 extends from chamber 116 to a space in the recess 103 inward of the bushing 115 and pasage 107 extends from the outer portion of the recess to the opening or cavity 140. Thus flow from chamber 116 to opening 140 (and thence via passage 109 in the piston 132 to chamber 122) is via the restricted clearance space constituting a restricted flow passage between the pin 121 and the internal surface of the bushing 115 in the tapered bore 117.

In operation of the sensor shown in FIGS. 6–10, as long as lubricant under pressure is delivered via the inlet 112 to chamber 116, the piston 132 is held back against the bias of spring 134 in a flow-through position wherein it unblocks the outlet port 114 for flow of lubricant from the inlet through the cylinder constituted by the bore 120 and thence out through outlet 114. With the piston in its stated flow-through position, arm 158 on Shaft 144 occupies a position in which screw 160 carried by the arm is retracted from the operating member 175 of the pneumatic valve 164. Chambers 116 and 122 are in communication via passage 130. On a failure of flow, spring 134 moves the piston toward its no-flow position of FIG. 8, as enabled by displacement of lubricant from chamber 116 to chamber 122 via passage 105, bleed 101, passage 107, space 140 and passage 109 in the piston 132. The flow of lubricant from chamber 116 to chamber 122 is retarded by the bleed 101, and thus the movement of the piston toward its no-flow position is at a controlled and relatively slow rate, so that the piston reaches its no-flow position only upon a relatively prolonged failure of flow and not upon a momentary or relatively short failure. Upon the movement of the piston to its no-flow position, arm 150, having its outer end received in annular groove 152 in the piston, is rocked by the piston to rotate shaft 144 to rock arm 158 to actuate the valve 164 thereby to signal the failure of flow.

It is to be specifically understood that a screw-thread capillary passage type of bleed such as shown in FIGS. 5 and 5A may be used instead of the tapered pin type of bleed shown in FIG. 10 for the sensor or FIGS. 6–10, and indeed may be preferable.

Figure 12:
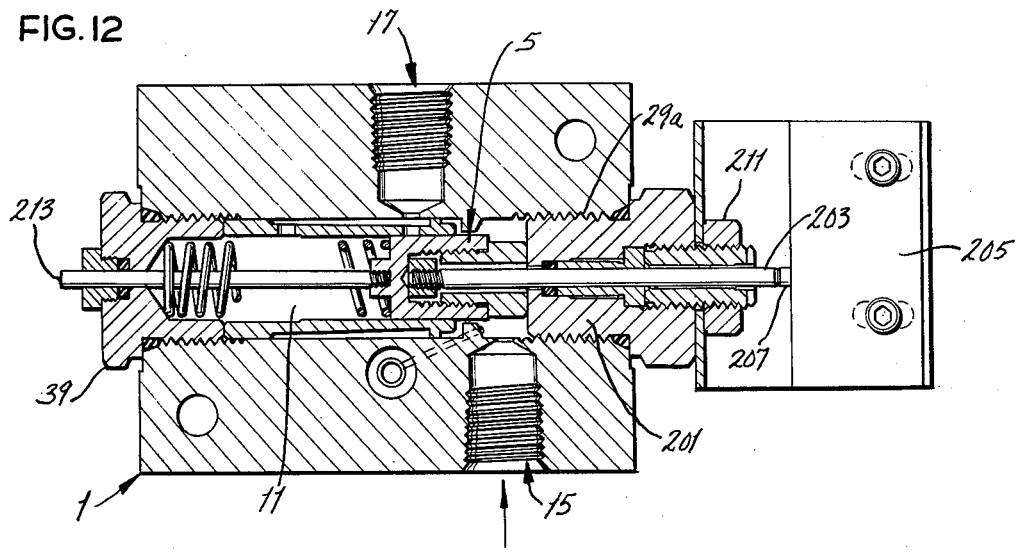
FIG. 12 is a longitudinal section on line 12—12 of FIG. 11.

FIGS. 11 and 12 show a third embodiment involving a modification of the sensor shown in FIGS. 1–5 for actuating a pneumatic valve for signalling failure of flow. In this third embodiment, the sensor is basiclly the same as the sensor of FIGS. 1–5 and the same reference characters are used in FIGS. 11 and 12 as in FIGS. 1–5 to designate similar parts. The difference is that instead of having plug 18 threaded in bore 29a as in FIG. 2, the embodiment of FIGS. 11 and 12 has a tubular plug 201 threaded in bore 29a, and the piston 5 is provided with a rod 203 extending through the plug 201 and slidable in sealed relation in the plug for controlling a pneumatic valve 205 for signalling cessation of flow. Valve 205 is of a conventional type having an operating button 207 engageable by the outer end of the rod 203 when the piston moves to its no-flow position, in which it is illustrated in FIG. 12, for actuation of the valve to transmit the no-flow signal. The valve 205 is carried by a bracket 209 held in place on the plug 201 as indicated at 211. A rod 213 is provided extending from the opposite side of the piston 5 through the plug 30 and slidable in sealed relation in the plug 39 to compensate for the cross-sectional area of rod 203.

FIGS. 13–17 illustrate another flow sensor of this invention, which has been developed particularly for sensing failure of flow from a pump P (see FIG. 17) of a series of lubricant pumps such as the Model 55 lubricant pump sold by the Lincoln St. Louis Division of McNeil Corporation, each pump in the series being operated by a common drive such as a shaft carrying cams for operating the plungers of the pump, thereby to determine that there is oil in the reservoir R supplying the pumps and to sense failure of the drive for the series. The sensor, which is generally similar to the other sensors herein described, comprises a body 301 having a cylinder 303 therein closed at its ends and a piston 305 slidable axially in the cylinder dividing the cylinder into a first chamber 307 between the piston and plug 309 which closes one end of the cylinder (its right-hand end as viewed in FIG. 13) and a second chamber 311 between the piston and plug 313 which closes the other end of the cylinder (its left-hand end as viewed in FIG. 13). The body has a lateral inlet 315 adjacent its end at 309 (its right-hand end) for delivery of lubricant under pressure to chamber 307, and a first passage 317 extending parallel to the cylinder 303 longitudinally of the body from the inlet (with which it is in direct communication) to the other end of the body for delivery of lubricant from the inlet via a line 319 to a pressure switch 321. The body 301 has a second passage 323 extending from the second chamber 311 in the cylinder to the exterior of the body where it has a nipple 325 for connection of a line 327 for returning lubricant to the reservoir R for the pump P. At 329 is indicated the recess of an adjustable bleed passage means 331, which as shown in FIG. 14 is of the tapered pin type corresponding to the bleed of FIG. 10, but which may be and probably preferably is of the screw type shown in FIG. 4. This recess, at its inner end, intersects and is thereby in communication with the stated first passage 317 (see FIG. 15). A third passage 333 interconnects the cylinder 303 and the outer end of the recess, and a fourth passage 335 interconnects the outer end of the recess and the stated second passage 323. This fourth passage is drilled at an angle in the body 301 as appears in FIG. 14.

Figure 13:
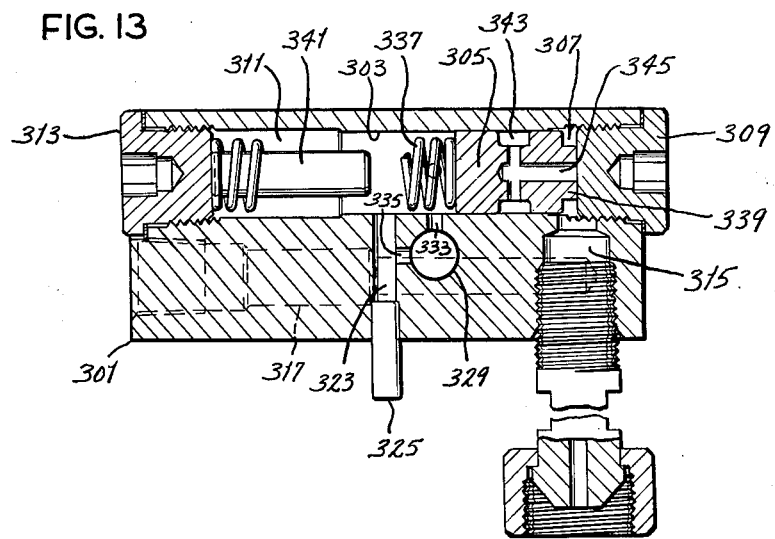
FIG. 13 is a vertical longitudinal section of a fourth embodiment, taken on line 13—13 of FIG. 15.

The piston is movable toward the left as shown in FIG. 13 away from the no-flow position adjacent the end at 309 of the cylinder (i.e., its right-hand end), wherein it blocks port 333 from the inlet to a flow-through position wherein it unblocks port 333 from the inlet as will appear. Spring means constituted by a coil compression spring 337 in the second chamber 311 reacting from the plug 313 against the left end of the piston biases the piston toward the right to its no-flow position of FIG. 13 determined by engagement of a nose 339 on the right end of the piston with plug 309. Spring 337 surrounds a pin 341 extending from the plug 313 constituting a stop engageable by the piston to determine its flow-through position. The piston has an annular peripheral groove 343 and passaging such as indicated at 345 from its right-hand end to the groove. In the no-flow position of the piston 305, groove 343 is located to the right of port 323 so that port 323 is blocked from the inlet 315. In the flow-through position of the piston 305, as determined by engagement of the left end of the piston with the end of pin 341, groove 343 registers with the port 333 so that port 333 is unblocked from the inlet.

As shown in FIG. 17, the outlet of pump P is connected as indicated at 347 to the inlet 315 of the sensor. The passage 323 of the sensor is connected as indicated at 327 to return lubricant to the reservoir R. Line 319, which includes a pressure gauge 349 connects passage 317 to the pressure switch 321. As long as pump P is delivering lubricant under pressure, the pressure switch 321 is pressure-actuated by pressure of lubricant delivered from the inlet 315 via passage 317 and line 319. Piston 305 is held back against the bias of spring 337 in its flow-through position wherein groove 343 registers with passage 333, and lubricant flows from the inlet 315 through chamber 307 of cylinder 303, passaging 345 and groove 343 in the piston, and passage 333 (acting as an outlet from the cylinder) to the outer end of the bleed recess 329, thence through the passage 335 (without passing through the bleed) to the passage 323 and through line 327 to the reservoir R.

On failure of flow of lubricant through inlet 315, chamber 307, passing 345 and groove 343 in the piston, passage 333, passage 335 and passage 323 to the reservoir R, spring 337 moves the piston 305 toward its no-flow position of FIG. 13, as enabled by displacement of lubricant from chamber 307 via the inlet 315 and passage 317 to the inner end of the bleed recess 329, thence outwardly through the bleed 331 for retarding the flow of the lubricant to the outer end of the bleed, and thence through the passage 335 to the passage 323 and out through line 327 to the reservoir. As the piston returns to its no-flow position, passage 333 is cut off from chamber 307 is forced to flow through inlet 315 into passage 317 thence through the bleed 331 and passages 335 and 323. Pressure in the pressure switch 321 is thereupon vented, thus signalling the failure of flow of lubricant, via line 319, passage 317 to the inner end of the bleed recess 329, through the bleed 331 to its outer end, and from its outer end through passage 335 and passage 323 via line 327 to the reservoir R.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A flow sensor for sensing failure of flow of a fluid such as lubricant comprising a body having a cylinder therein closed at its ends, a piston slidable axially in the cylinder dividing the cylinder into a first chamber between the piston and a first end of the cylinder and a second chamber between the piston and the second end of the cylinder, said body having an inlet for delivery of the fluid under pressure to the first chamber, an outlet located between the inlet and the second end of the cylinder interconnected with the second chamber, the piston being movable away from a no-flow position adjacent the first end of the cylinder wherein it blocks the outlet from the inlet to a flow-through position wherein it unblocks the outlet from the inlet for flow of the fluid from the inlet to and out through the outlet, spring means biasing the piston to its no-flow position, the piston being movable against the bias by the pressure of the fluid in the first chamber to its flow-through position, and means for signalling when the piston is in its no-flow position, wherein the improvement comprises the provision in said body of an adjustable bleed passage means interconnecting the first and the second chambers for passage of fluid from the first chamber to the second chamber at a controlled rate when flow ceases and the spring means moves the piston to its no-flow position to retard the movement of the piston.

2. A flow sensor as set forth in claim 1 wherein said adjustable bleed passage means in the body comprises a recess extending into the body from the exterior of the body, the body having a first passage for flow of fluid from the first chamber to the recess as the piston moves to its no-flow position, a second passage for flow of fluid from the recess, means in the recess providing an adjustable restriction to the flow of fluid from the first to the second passage, and means accessible from the exterior of the body for adusting said restriction.

3. A flow sensor as set forth in claim 2 wherein said means providing an adjustable restriction comprises a tubular member in the recess, a tubular retainer holding said tubular member in the recess, a screw-threaded plug having a sliding sealing fit in said tubular member, means biasing the plug to slide in the direction toward the tubular retainer, and said adjusting means comprising a stop adjustably threaded in the tubular retainer engageable by the plug, the thread on the plug providing a capillary passage for restricted flow of lubricant, and the effective length of said capillary passage being variable by adjusting the plug axially in said tubular member.

4. A flow sensor as set forth in claim 2 wherein said means providing an adjustable restriction comprises a tubular member in the recess having a tapered bore, a tapered pin in the bore, a tubular retainer for holding said tubular member in the recess, the narrow end of the bore and pin being toward the retainer, means biasing the pin in the direction toward the retainer, and said adjusting means comprising a stop adjustably threaded in the tubular retainer, said pin being axially movable by threading said stop in or out to provide an adjusted restricted passage between the pin and the internal surface of the tubular member in the bore.

5. A flow sensor for sensing failure of flow of a fluid such as lubricant comprising a body having an opening therethrough from one end to the other, a tubular bushing fitted in said opening extending axially from adjacent said one end of the opening toward and terminating short of the other end of the opening, said bushing being formed to provide a space between the bushing and portion of the body surrounding the bushing, means holding the bushing in the opening and closing said one end of the opening, means closing the other end of the opening, a piston slidable axially in the bushing constituting the space in the opening on the side of the piston toward the other end of the opening as a first chamber and the space in the bushing as a second chamber, an inlet extending through the body from a side of the body to the first chamber, an outlet comprising an inner port through the bushing from the interior of the bushing to said first-mentioned space and an outer port from said first-mentioned space to the exterior of the body, the piston being movable away from a no-flow position at the end of the bushing toward said other end of the opening in the body wherein it blocks said inner port to a flow-through position wherein it unblocks said inner port, a recess at a side of the body, spring means biasing the piston to its no-flow position, a first passage in the body from the first chamber to the recess, a second passage in the body from the recess to said first-mentioned space, means in the recess providing an adjustable restriction to flow of fluid from the first to the second passage, means accessible from the exterior of the body for adjusting said restriction, the second chamber being in communication with said first-mentioned space, the piston being movable against the bias of said spring means by the pressure of fluid in the first chamber to its said flow-through position, and being movable by said spring means to its no-flow position on failure of flow, and means controlled by the piston for signalling the movement of the piston to its no-flow position.

6. A flow sensor as set forth in claim 5 having a rod extending through the said means closing the other end of the opening in slidable sealed relation thereto, said means for signalling the movement of the piston to its no-flow position being on the outside of the body and operable by the rod.

7. A flow sensor as set forth in claim 6 wherein said signalling means is a pneumatic valve.

8. A flow sensor as set forth in claim 6 wherein the piston has a rod extending in slidable sealed relation through the said means which holds the bushing in the opening and closes said one end of the opening.

9. A fluid sensor for sensing failure of flow of fluid such as lubricant comprising a body having a cylinder therein closed at its ends, a piston slidable axially in the cylinder dividing the cylinder into a first chamber between the piston and a first end of the cylinder and a second chamber between the piston and the second end of the cylinder, said body having an inlet for delivery of the fluid to the first chamber, an outlet located between the inlet and the second end of the cylinder interconnected with the second chamber, the piston being movable away from a no-flow position adjacent the first end of the cylinder wherein it blocks the outlet from the inlet to a flowthrough position wherein it unblocks the outlet from the inlet for flow of the fluid from the inlet to and out through the outlet, spring means biasing the piston to its no-flow position, the piston being movable against the bias by the pressure of the fluid in the first chamber to its flow-through position, a cavity formed in the side of the body opening laterally into the cylinder, means in said cavity connected to the piston for operation by the piston to transmit a signal upon movement of the piston to its no-flow position, a recess at a side of the body, a first passage from the first chamber to the recess, a second passage from the recess to said cavity, means in the recess providing an adjustable restriction to the flow of fluid from the first to the second passage, means accessible from the exterior of the body for adjusting said restriction, and a passage through the piston for flow of fluid from said cavity to said second chamber.

10. A fluid sensor for sensing failure of flow of fluid such as lubricant comprising a body having a cylinder therein closed at its ends, a piston slidable axially in the cylinder dividing the cylinder into a first chamber between the piston and a first end of the cylinder and a second chamber between the piston and the second end of the cylinder, the piston being movable away from a no-flow position adjacent the first end of the cylinder to a flow-through position spaced from its no-flow position, spring means biasing the piston to its no-flow position, said body having an inlet for delivery of fluid to the first chamber, a first passage in communication with the inlet for delivery of fluid from the inlet to a pressure switch connected to said first passage, a second passage from the second chamber to the exterior of the body, a recess at a side of the body in communication at one end with said first passage, a third passage from the cylinder to the other end of the recess, a fourth passage from the other end of the recess to the second passage, means in the recess providing an adjustable restriction to flow of fluid from the first passage to the third and fourth passages, means accessible from the exterior of the body for adjusting said restriction, and a passage in the piston for flow of fluid from the first chamber through the piston to the third passage when the piston is in its flow-through position.

* * * * *